3,314,928
COPOLYMERS OF 1-ALKENES AND 1-ALKENES HAVING AN ω-N-SUBSTITUENT

Robert Bacskai, Berkeley, Calif., assignor to Chevron Research Company, San Francisco, Calif., a corporation of Delaware
No Drawing. Filed Aug. 23, 1965, Ser. No. 481,910
7 Claims. (Cl. 260—87.5)

This application is a continuation-in-part of copending application Ser. No. 269,139, filed Mar. 29, 1963, and now abandoned.

This invention concerns a new group of nitrogen-containing poly-1-alkenes which are receptive to acid dyes. More particularly, it is directed to copolymers of 1-alkenes and 1-alkenes having an ω-N-substituent.

It is believed to be well recognized in the art that poly-1-alkenes prepared with "Ziegler-Natta"-type catalysts, due to their hydrophobicity and general inertness, are quite difficult to dye. Consequently, various means have been previously employed to make poly-1-alkenes more receptive to dyeing. For instance, various halogenated organic compounds such as dichloroethylene have been physically mixed with poly-1-alkenes and the physical mixture subjected to amination. This procedure has some distinct drawbacks. First, it requires a number of separate steps, e.g., polymerization, mixing and amination. Further, the uniformity of the dye receptivity of the mixture is likely to be inconsistent because the basic nitrogen is not regularly dispersed within the mixture. Other approaches involving poly-1-alkene fibers have involved grafting reactive nitrogen-containing monomers onto the fibers. This approach is unsatisfactory in that the grafting occurs only on the surface of the fiber and it does not provide a polymer which is very susceptible to deep dyeing. Hence, a polymer fiber so treated is more likely to fade.

A new group of 1-alkene copolymers have now been discovered which contain uniform pendant terminal nitrogen groups throughout the copolymer and thus provide excellent uniform receptivity to acid dyes. The nitrogen groups in these copolymers are regularly dispersed throughout the copolymer structure and are pendant with respect to the copolymer backbone. All are bound via the nitrogen to the same type of carbon atom, i.e., a primary carbon atom. Consequently, each nitrogen grouping tends to be of the same reactivity. These characteristics provide enhanced, uniform and complete acid dye receptivity in the polymer composition.

In accordance with this invention these unique compositions are solid copolymers comprising from 70–99 mol percent polymerized hydrocarbon 1-alkene and from about 1–30 mol percent polymerized 1-alkene having a single mononitrogen group substituted for an omega hydrogen thereof. The copolymeric compositions of this invention may be prepared using "Ziegler-Natta"-type catalysts. In particular, they may be made by copolymerizing mixtures of hydrocarbon 1-alkenes and ω-monohalo-1-alkenes in the presence of "Ziegler-Natta"-type catalysts and aminating the reaction product thereof with a primary, secondary or tertiary amine or ammonia.

The addition polymerizable hydrocarbon 1-alkenes used in this invention contain from 2 to 10 carbon atoms, preferably from 2 to 8 carbon atoms and even more preferably from 3 to 6 carbon atoms. These 1-alkenes all have vinyl group and may be represented by the formula (1) $$RCH=CH_2$$

wherein R is either hydrogen or an alkyl group of from 1 to 8 carbon atoms. Preferably, R is methyl. Illustrative of the alkenes represented by the above formula are ethylene, propylene, 1-butene, 1-pentene, 1-hexene, 1-octene, 1-decene, 4-methyl-1-pentene, 3-methyl-1-pentene, 3-methyl-1-butene, 1-isohexene, etc. These monomers may be used individually or in combination.

When they are copolymerized, the 1-alkenes of from 3 to 10 carbon atoms are stereoregular. When ethylene is the copolymerized 1-alkene, it is essentially unbranched in its polymerized form.

The ω-monohalo-1-alkenes which may find use in the preparation of the nitrogen-containing copolymers of this invention have at least 4 carbon atoms. They may be represented by the following formula (2) 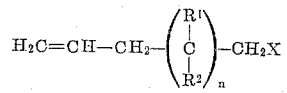

wherein $n$ is an integer from 0 to 8, X is halogen of atomic number 17 to 35, i.e., chlorine and bromine, and $R^1$ and $R^2$ are hydrogen or lower alkyl groups, preferably hydrogen.

Illustrative of some of the ω-monohalo-1-alkene precursors represented by Formula 2 are 4-chloro-1-butene, 6-bromo-1-hexene, 4-methyl-5-bromo-1-pentene, 7-bromo-1-heptene, 10-chloro-1-decene, 5,5-dimethyl-7-bromo-1-heptene, 9-chloro-1-nonene, 9-bromo-1-none, 10-bromo-1-decene, 12-bromo-1-dodecene, 12-chloro-1-dodecene, 4,6-dimethyl-8-bromo-1-octene, etc. The ω-monohalo olefins will generally be in the range of 4 to 16 carbon atoms and more usually in the range of from 4 to 12 carbon atoms. These monomers may be used individually or in combination.

Of course, after the copolymer is aminated X (the halogen) in Formula 2 will be substituted with a mononitrogen-containing group. The group is bound to the 1-alkene via its nitrogen atom. Since "Ziegler-Natta"-type polymerizations produce 1,2-addition, the nitrogen group will be at least 2 carbon atoms removed from the copolymer backbone. Considering the 1-alkene portion of the copolymer which is derived from the ω-monohalo-1-alkene, it will contain the same number of carbon atoms as the precursor. In other terms, excluding the nitrogen group, the ω-N-substituted 1-alkene will contain from 4 to 16 carbon atoms and more usually from 4 to 12 carbon atoms. With the nitrogen group the ω-N-substituted 1-alkene will have from 4 to about 70 carbon atoms, more usually from 4 to about 30 carbon atoms.

The catalysts used in preparing the copolymer compositions of this invention are "Ziegler-Natta"-type catalysts. These catalysts comprise an organo-aluminum compound and a titanium or vanadium compound. The organo-aluminum compounds are trihydrocarbyl aluminum, dihydrocarbyl aluminum halide and hydrocarbyl aluminum sesquihalide, wherein the hydrocarbyl group is from 1 to 10 carbons, preferably of from 1 to 6 carbons. (Hydrocarbyl is a monovalent radical containing only carbon and hydrogen and may be aliphatic, alicyclic or aromatic.) The hydrocarbyl aluminum compounds have a ratio of hydrocarbyl groups to aluminum of greater than 1, i.e., 1.5 to 3. The halide can be fluoride, chloride, bromide or iodide, but is preferably chloride.

Both titanium and vanadium compounds can be used with the above aluminum compounds depending on the particular copolymer desired. Where a copolymer containing a polymerized hydrocarbon 1-alkene of at least 3 carbons is desired, e.g., propylene, 4-methyl-1-pentene, 1-butene, etc., titanium cocatalyst would be used with trihydrocarbyl aluminum or dihydrocarbyl aluminum halide. On the other hand, if a combination of hydrocarbon 1-alkenes, such as ethylene-propylene, is desired, a vanadiim co-catalyst would be used. Either the vanadium or titanium compounds can be used with ethylene.

The titanium and vanadium catalyst compounds are halides. Preferably, the halogen has an atomic number of 17 to 35, and particularly preferred are the chlorides. Other elements such as oxygen may be present, as in vanadium oxychloride.

Illustrative of various aluminum compounds are diethyl aluminum chloride, tributyl aluminum, trihexyl aluminum, ethyl aluminum sesquihalide, diethyl aluminum bromide, etc. Illustrative of compounds of metals of atomic number 22 to 23, i.e., titanium and vanadium, are titanium trichloride, titanium tribromide, vanadium trichloride, vanadium oxytrichloride, vanadium penta-chloride, vanadium tribromide, etc. The preferred catalysts are titanium trichloride, vanadium oxychloride and vanadium trichloride.

The mol ratio of the aluminum compound to the titanium or vanadium compound is usually in the range of 1–5:1, preferably 2–4:1. The ratio of mols of titanium to solvent will usually be in the range of about 0.1 to 5 mm./100 ml. solvent, preferably 0.5 to 2 mm./100 ml. solvent.

The temperature at which the copolymerization is carried out is generally in the range of about 35° C. to 100° C., depending on the monomers, the catalyst, etc. When one or more of the monomers are gaseous, the pressure may vary from 10 to 2,000 p.s.i., more usually in the range of about 10 to 200 p.s.i. When the monomers are liquids, such as 4-methyl-1-pentene or 3-methyl-1-pentene, the concentration of monomer will usually be in the range of about 5% to 50% by weight of the solution or may serve as its own solvent (100%).

The nitrogen group of the copolymer compositions of this invention may be introduced by displacing the halogen in the 1-alkene/ω-monohalo-1-alkene copolymer described above with ammonia or an amine. This amination may be carried out by treating the halogen-containing copolymer with a boiling amine solution. In the case of low-boiling amines, use of superatmospheric pressure may be desirable in order to permit use of higher reaction temperatures. The concentration of amine with respect to the copolymer may vary considerably. If a quantitative displacement of the halogen is desired ammonia or the amine must be present in at least an equimolar portion to the halogen in the copolymer—this would be from 1 to 30 mol percent based on the total copolymer. However, excess concentration of amine facilitates faster reaction and it is thus preferable to aminate using excess mol ratios of amine to copolymer of about 10 to 2,000:1.

The reaction times and temperatures of the amination may also vary considerably. Longer times give more complete displacement, and higher temperatures produce faster reaction rates. It is believed that the chemist of ordinary skill will be able to readily pick a sufficient amine concentration, reaction time and reaction temperature which will effect the desired amination. Usually the temperature of reaction will be carried out at the reflux of the copolymer-amine slurry. In most cases this will be between about −10 and 200° C. Under such conditions, the reaction time will usually vary from about a minute to 25 hours.

In general, ammonia or any primary, secondary or tertiary amine having a single, basic nitrogen which is sufficiently basic to react with hydrochloric acid to produce a salt may be employed in this invention. These amines will have a $pK_b$ from about 2.5 to 9.5 as measured in 0.01 M aqueous solutions at 25° C. using 0.5 N hydrochloric acid. Amines which may be employed in this invention include saturated aliphatic, saturated alicyclic, aromatic and heterocyclic amines. These amine compounds may contain inert substituents such as Cl, Br and OH. However, except for the heterocyclic amines which may contain heteroatoms such as oxygen, sulfur, etc., the amines of this invention will usually consist of a single nitrogen, hydrogen and from about 1 to 50 carbon atoms, more usually from 1 to 10 carbon atoms. Their molecular weights will usually vary from about 30 to 700.

The saturated aliphatic, saturated alicyclic and the aromatic amines contemplated by this invention may be represented by the structural formula (3)

wherein $R^3$ and $R^4$ individually represent hydrogen or hydrocarbyl groups of from 1 to 16 carbons which are free of ethylenic or acetylenic unsaturation and $R^5$ is a hydrocarbyl group of from 1 to 16 carbons which is free of ethylenic or acetylenic unsaturation. These hydrocarbyl groups include alkyl, cycloalkyl, alkaryl, aryl, etc. Preferably, $R^3$ and $R^4$ represent hydrogen or lower alkyl and $R^5$ represents lower alkyl.

Illustrative of some of the nitrogen groups which may be derived from the amines of Formula 3 are monoalkylamino groups such as methylamino, ethylamino, isopropylamino, butylamino, etc., phenylamino, naphthylamino, benzylamino, cyclohexylamino, cyclobutylamino, etc., dialkylamino groups such as dimethylamino, dibutylamino, dihexylamino, methylethylamino, ethylbutylamino, etc., diphenylamino, dibenzylamino, etc.

It should be recognized that in the case of the copolymers of this invention which are prepared by aminating an ω-halo-1-alkene/1-alkene copolymer with a primary or secondary amine, the nitrogen groups in the copolymer may be present as quaternary ammonium salts. Structurally the individual groupings would be represented as follows

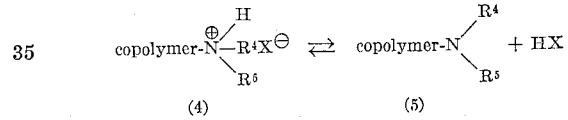

(4)  (5)

wherein $R^4$ and $R^5$ and X are as previously described. Naturally, when excess basic amine is used an equilibrium will be established between the quaternary ammonium form of the copolymer (4) and the amino form of the copolymer (5). The copolymer quaternary ammonium groups may be converted entirely to substituted amino groups by further treatment with caustic.

When the halogen is displaced with a tertiary amine, the nitrogen groups are present in the copolymer solely as quaternary ammonium salts, i.e., (6)
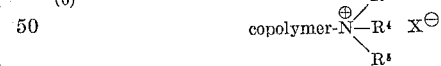

wherein $R^3$, $R^4$, $R^5$ and X are as previously defined. These groups, when derived from aliphatic or aromatic amines, may be considered as substituted ammonium groups. Examples of the more common aliphatic, alicyclic and aromatic ammonium groups derived from the corresponding tertiary amines are the substituted ammonium groups such as trimethylammonium, triethylammonium, tributylammonium, dimethylethylammonium, phenyldimethylammonium, phenyldiethylammonium, p-methylphenyldimethylammonium, cyclohexyldimethylammonium, and the like.

The heterocyclic amines of this invention are those compounds containing either a secondary or a tertiary N in the heterocyclic ring. They contain only a single basic nitrogen but may also contain an annular oxygen or sulfur atom. The $pK_b$ of these compounds, as with the other amines, will be between about 2.5 and 9.5. As before, the secondary amines may be present as "ino" or onium groups. By "ino" group is meant an uncharged group derived from a heterocyclic amine such as that shown by Formula 5. Illustrative of the groups derived from heterocyclic amines are pyridinium, picolinium, piperidino or piperidinium, morpholino or morpholinium, thiomorpholinium, pyrrolidino or pyrrolidinium, quinolinium, and the like.

The total nitrogen in the copolymer compositions of this invention will be in the range of about 0.1 to 10 weight percent, based on the polymer. More usually, it will comprise from about 0.1 to 3 weight percent of the copolymer.

The nitrogen-containing copolymers of this invention will usually have an intrinsic viscosity in the range of from about 0.3 to 10, more usually from 1 to 3 (measured in decalin at 135° C.).

The following examples illustrate the unique copolymers of this invention and their method of preparation.

Example I

Into a reaction vessel purged with nitrogen was introduced 0.50 gm. of diethyl aluminum chloride, 0.54 gm. TiCl₃AA* and 100 ml. of n-heptane. To this mixture was added 1 ml. of 5-chloro-1-pentene. The reaction vessel was heated to 70° C. and pressurized with 50 p.s.i. of propylene. After two hours while maintaining the temperature and pressure, the reaction vessel was cooled and the catalyst killed with methanol. The polymer was then filtered off, washed with methanol several times and dried in vacuo. The product weighed 7.17 gms. and had an intrinsic viscosity $[\eta]=2.5$. The product contained 0.43% by weight chlorine.

A slurry of 1.0 gm. of this polymer product and 25 ml. pyridine was refluxed for 8 hours. After cooling to room temperature, a large excess of methanol was added and the product was filtered. It was washed several times with HCl containing methanol and dried in vacuo. The yield was 0.57 gm. The analysis of the nitrogen in the product indicated a quantitative displacement of the chlorine with pyridine to the quaternary ammonium compound.

Example II

Into a reaction vessel purged with nitrogen was introduced 0.48 gm. diethyl aluminum chloride, 0.48 gm. TiCl₃AA* and 100 ml. heptane. To this mixture was added 1 ml. 5-chloro-1-pentene. The reaction vessel was heated to 50° C. and 20 ml. 4-methyl-1-pentene was added. After 102 minutes at this temperature, the reaction vessel was cooled and the catalyst killed with methanol. The polymer was then filtered off, washed with methanol several times and dried in vacuo. The product weighed 4.3 gms. and had an intrinsic viscosity $[\eta]=2.1$. The product contained 3.14% chlorine by weight.

A slurry of 0.5 gm. of the above product and 25 ml.

*3TiCl₃·AlCl₃.

pyridine was refluxed for 20 hours. After cooling to room temperature, a large excess of methanol was added and the product was filtered. It was washed several times with HCl and dried in vacuo. The yield was 0.33 gm. The product had a nitrogen content of 1.16 weight percent and a chlorine content of 2.59 weight percent showing almost quantitative displacement of the chlorine with pyridine to the quaternary ammonium compound.

In accordance with the methods described in Examples I and II, other ω-halo-1-alkene/1-alkene copolymers were prepared and aminated with various amines. The summary of these preparations is tabulated below for convenience.

TABLE I

| Starting Copolymer | | | Amination | | | | |
|---|---|---|---|---|---|---|---|
| Character | $[\eta]$, dl./g. | Br or Cl, Wt. percent | Amine | ° C. | Hrs. | $[\eta]$ Product, dl./g. | Wt. percent N found |
| Propylene/8-bromo-1-octene | 5.7 | 1.59 | Pyridine | 100 | 2 | 2.9 | 0.27 |
| Do | 5.7 | 1.59 | Morpholine | 100 | 2 | 5.8 | 0.33 |
| 4-methyl-1-pentene/8-bromo-1-octene. | 4.1 | 11.30 | Pyridine | 100 | 2 | (¹) | 1.36 |
| Propylene/8-bromo-1-octene | 3.4 | 0.86 | n-Butylamine | 78 | 1 | 3.76 | .18 |
| Do | 3.4 | 0.86 | Diethylamine | 57 | 1 | 3.35 | 0.10 |
| Do | 3.4 | 0.86 | Triethylamine | 88 | 1 | 3.36 | 0.10 |
| 4-methyl-1-pentene/5-chloro-4-methyl-1-pentene. | 1.5 | 1.8 | Morpholine | 180 | 3 | | 0.63 |

¹ Insoluble in decalin.

These examples are offered by way of illustration only and are in nowise limiting on the invention as herein described.

Illustrative of the various copolymers of this invention are ethylene with 5-ammonium-1-pentene, propylene with 8-ammonium-1-octene, ethylene with 5-methylamino-1-pentene, ethylene with 6-diethylamino-1-hexene, ethylene with 4-methylammonium-1-butene, propylene with 8-dibutylamino-1-octene, propylene with 9-phenylammonium-1-nonene, propylene with 6-cyclohexylamino-1-hexene, propylene with 10-dibenzylammonium-1-decene, propylene with 5-trimethylammonium-1-pentene, 1-butene with 4-methylethylamino-1-butene, 1-pentene with 8-i-propylammonium-1-octene, 1-hexene with 6-tributylammonium-1-hexene, ethylene/propylene with 11-methylamino-1-undecene, propylene/1-butene with 8-trihexylammonium-1-octene, propylene with 5-pyridinium-1-pentene, 1-octene with 8-picolinium-1-octene, ethylene with 6-piperidino-1-hexene, 1-heptene with 8-morpholinium-1-octene, propylene with 5-dimethylammonium-1-pentene and 8-pyridinium-1-octene, etc.

The copolymers of this invention have excellent receptivity towards acid dyes such as Alizarin Blue, Chicago Blue 6B, Fast Red A, Orange II, etc., especially when in their quaternary salt form. For instance, the pyridinated propylene/8-bromo-1-octene copolymer reported as the first copolymer in Table I was dyed rapidly to a deep blue shade with acidified aqueous solutions of Calcocid Alizarin Blue. The dyeing was permanent, and the color could not be removed by washing the dyed copolymer with hot aqueous detergent solution. Neither polypropylene nor the propylene/8-bromo-1-octene copolymer would dye under the same conditions.

As will be evident to those skilled in the art, various modifications on this invention can be made or followed, in the light of the foregoing disclosure and discussion, without departing from the spirit or scope of the disclosure or from the scope of the following claims.

I claim:

1. A solid dyeable product prepared by copolymerizing a hydrocarbon mono-1-alkene having 2 to 10 carbon atoms and an ω-monohalo-mono-1-alkene of the formula

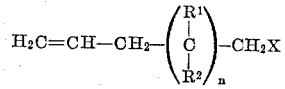

wherein $n$ is an integer from 0 to 8, X is halogen of atomic number 17 to 35 and $R^1$ and $R^2$ are hydrogen or lower alkyl groups, wherein the mol ratio of ω-monohalo-1-monoalkene to mono-1-alkene is in the range of 1:99 and 3:7, with a catalyst comprising a hydrocarbyl aluminum compound wherein the hydrocarbyl groups contain 1 to 10 carbon atoms, the ratio of hydrocarbyl groups to aluminum is greater than 1 and the remaining valences of aluminum are satisfied by halogen atoms and a vanadium halide wherein the halogens are of atomic number 17 to 35, titanium halide wherein the halogens are of atomic number 17 to 35 or vanadium oxychloride and aminating the product of the copolymerization with ammonia, an amine of the formula

wherein $R^3$ and $R^4$ are individually hydrogen or hydrocarbyl groups free of ethylenic and acetylenic unsaturation and having 1 to 16 carbon atoms and $R^5$ is a hydrocarbyl group free of ethylenic and acetylenic unsaturation and having 1 to 16 carbon atoms or a heterocyclic amine having a secondary or tertiary nitrogen in the heterocyclic ring and the nitrogen content of said product is from about 0.1 to 10 percent, based on said product.

2. Product of claim 1 wherein the mono-1-alkene contains 3 to 6 carbon atoms.

3. Product of claim 1 wherein the mono-1-alkene is propylene or 4-methyl-1-pentene.

4. Product of claim 1 wherein the product of the copolymerization is aminated with monoalkylamine, dialkylamine, trialkylamine, pyridine or morpholine.

5. Product of claim 1 wherein $R^1$ and $R^2$ are hydrogen.

6. Product of claim 1 wherein the vanadium halide is vanadium trichloride and the titanium halide is titanium trichloride.

7. Product of claim 1 wherein the ω-monohalo-mono-1-alkene is 5-chloro-1-pentene, 8-bromo-1-octene or 5-chloro-4-methyl-1-pentene.

References Cited by the Examiner
UNITED STATES PATENTS

| | | | |
|---|---|---|---|
| 2,591,573 | 4/1952 | McBurney | 260—88.1 |
| 2,597,440 | 5/1952 | Bodamer | 260—88.1 |
| 2,632,000 | 3/1953 | McMaster et al. | 260—88.1 |
| 2,656,338 | 10/1953 | Lytton | 260—88.1 |
| 3,057,833 | 10/1962 | Devlin | 260—88.1 |
| 3,092,563 | 6/1963 | Agius et al. | 260—875 |
| 3,100,764 | 8/1963 | Jezl et al. | 260—93.7 |

OTHER REFERENCES

Natta: J. Pol. Sci., 34 (1959), pp. 531–549.

JOSEPH L. SCHOFER, *Primary Examiner.*

H. WONG, JR., *Assistant Examiner.*